United States Patent
Kim et al.

(10) Patent No.: US 9,742,699 B2
(45) Date of Patent: Aug. 22, 2017

(54) NETWORK APPARATUS AND SELECTIVE INFORMATION MONITORING METHOD USING THE SAME

(71) Applicant: ELECTRONICS AND TELECOMMUNICATIONS RESEARCH INSTITUTE, Daejeon (KR)

(72) Inventors: Heemin Kim, Daejeon (KR);
Jeong-Han Yun, Daejeon (KR);
Kyoung-Ho Kim, Gokseong-gun (KR);
Woonyon Kim, Daejeon (KR);
Jungtaek Seo, Daejeon (KR); Eungki Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 214 days.

(21) Appl. No.: 14/289,803

(22) Filed: May 29, 2014

(65) Prior Publication Data
US 2015/0109936 A1    Apr. 23, 2015

(30) Foreign Application Priority Data
Oct. 17, 2013   (KR) .......................... 10-2013-0123776

(51) Int. Cl.
*H04L 12/947*   (2013.01)
*H04L 12/26*   (2006.01)
*H04L 29/06*   (2006.01)

(52) U.S. Cl.
CPC ............ *H04L 49/25* (2013.01); *H04L 43/022* (2013.01); *H04L 43/028* (2013.01); *H04L 43/14* (2013.01); *H04L 63/1408* (2013.01); *H04L 43/026* (2013.01)

(58) Field of Classification Search
None
See application file for complete search history.

(56) References Cited

U.S. PATENT DOCUMENTS

| | | |
|---|---|---|
| 7,644,157 B2 | 1/2010 | Shomura et al. |
| 2003/0031462 A1* | 2/2003 | Katsuno ................ H04L 43/028 386/239 |
| 2007/0245016 A1* | 10/2007 | Li ........................... H04L 49/25 709/224 |

(Continued)

FOREIGN PATENT DOCUMENTS

| | | |
|---|---|---|
| JP | 2004-207962 A | 7/2004 |
| JP | 2007-81938 A | 3/2007 |

(Continued)

*Primary Examiner* — Yaotang Wang
(74) *Attorney, Agent, or Firm* — LRK Patent Law Firm

(57) ABSTRACT

The present invention presents a network apparatus and a selective information monitoring method using the network apparatus, which allow a user to monitor only required information (the field information of packets) from all received packets. The network apparatus one or more physical interfaces connected to a monitoring target host and configured to receive network packets from the monitoring target host, and a switch fabric module including a configurable monitoring module configured to perform filtering so that selective information is extracted from the network packets collected through the one or more physical interfaces.

14 Claims, 7 Drawing Sheets

(56) References Cited

U.S. PATENT DOCUMENTS

| | | | |
|---|---|---|---|
| 2008/0025322 A1* | 1/2008 | Tadimeti | ............... H04L 41/08 370/400 |
| 2008/0123525 A1 | 5/2008 | Miyoshi et al. | |
| 2012/0210125 A1 | 8/2012 | Shigemoto et al. | |

FOREIGN PATENT DOCUMENTS

| | | |
|---|---|---|
| JP | 2007-243373 A | 9/2007 |
| JP | 2007-336512 A | 12/2007 |
| JP | 2008-042915 A | 2/2008 |
| JP | 2009-231890 A | 10/2009 |
| JP | 2012-151673 A | 8/2012 |
| JP | 2012-156695 A | 8/2012 |
| JP | 2012-169756 A | 9/2012 |
| KR | 10-0671044 B1 | 1/2007 |
| KR | 10-0814546 B1 | 3/2008 |
| KR | 10-0850629 B1 | 8/2008 |
| WO | 00/31963 A1 | 6/2000 |

\* cited by examiner $L2 = \{ L2(1), L2(2), L2(3), L2(4), L2(5) \}$ $L3 = \{ L3(1), L3(2), L3(3), L3(4), L3(5) \}$ $L4 = \{ L4(1), L4(2), L4(3), L4(4), L4(5) \}$

T = TIME AT WHICH PACKET ARRIVES AT NETWORK EQUIPMENT

P = NAME OF INTERFACE THROUGH WHICH PACKET IS INPUT TO NETWORK EQUIPMENT $U = L2 \cup L3 \cup L4 \cup \{T, P\}$ MONITORING INFORMATION $\subseteq U$

FIG. 4

MONITORING
INFORMATION OF
MONITORING
TARGET PACKET

NETWORK APPARATUS AND SELECTIVE INFORMATION MONITORING METHOD USING THE SAME

CROSS REFERENCE TO RELATED APPLICATION

This application claims the benefit of Korean Patent Application No. 10-2013-0123776, filed on Oct. 17, 2013, which is hereby incorporated by reference in its entirety into this application.

BACKGROUND OF THE INVENTION

1. Technical Field

The present invention relates generally to a network apparatus and a selective information monitoring method using the network apparatus and, more particularly, to a network apparatus and a selective information monitoring method using the network apparatus, which can monitor only selective information.

2. Description of the Related Art

Present networks are exposed to many security threats due to a large number of services. In order to solve this problem, security equipment is added to and operated in existing networks.

In order to prevent external attacks, networks are protected using a firewall, and attempts to intrude on external systems and hacking attempts are detected and prevented in real time using an Intrusion Detection System (IDS) and an Intrusion Prevention System (IPS).

However, attacks on present networks cause not only hacking attempts on a specific host, but also errors in network equipment, and thus networks are also exposed to security threats inducing network disabling. In order to defend networks against such attacks, technology for analyzing and detecting network packets in real time have been developed.

In order to monitor an internal network, all traffic passing through a network switch must be monitored. For this, methods that can be currently used include a network switch mirroring technique and a tapping technique.

A network switch mirroring technique is a scheme in which software in a network switch copies a monitoring target packet and transmits the copied packet to a switch interface desired to be monitored. This technique may cause a problem in the performance of a network switch itself because a large amount of network switch resources (Central Processing Unit (CPU) or the like) are used when there is a large amount of traffic.

A tapping technique is a scheme for installing tapping equipment in each switch interface desired to be monitored and electrically copying packets. In this case, in order to monitor 24 ports, 24 pieces of equipment must be installed. Further, in order to collect traffic desired to be monitored through 24 ports into a single port and monitor the collected traffic, additional equipment called a traffic aggregator is required. That is, it is realistically difficult to manage the equipment due to the complicated wiring thereof, and it is also difficult to introduce additional equipment due to the very high price thereof.

The most serious problem of the conventional schemes is that, when the amount of traffic desired to be monitored is large, packet loss (drop) is inevitably caused.

When a single traffic analysis system desires to monitor all packets input through 24 1-Gigabit (G) ports, data at a maximum of 24 Gbps must be collected through a single port and must be transmitted to the traffic analysis system. However, since the maximum capacity that can be processed by a switch interface is 1 Gbps, it is impossible to collect all of 23 Gbps traffic mirrored by 23 interfaces.

Such a phenomenon appears similarly even in a traffic aggregator, so that a large-capacity port such as a 10 Gigabit port may also be supported according to the price, but the situation of such a physical limitation inevitably occurs.

As related preceding technology, Korean Patent No. 10-0814546 (entitled "Apparatus and method for collecting and analyzing communication data") discloses technology for collecting and analyzing communication data.

As another related preceding technology, Korean Patent No. 10-0671044 (entitled "Harmful traffic analysis system and method in an internal network") discloses technology for supporting the internal network so that harmful traffic in the internal network can be discovered in real time and can be suitably handled.

SUMMARY OF THE INVENTION

Accordingly, the present invention has been made keeping in mind the above problems occurring in the prior art, and an object of the present invention is to provide a network apparatus and a selective information monitoring method using the network apparatus, which allow a user to monitor only required information (the field information of packets) from all received packets.

In accordance with an aspect of the present invention to accomplish the above object, there is provided a network apparatus, including one or more physical interfaces connected to a monitoring target host and configured to receive network packets from the monitoring target host; and a switch fabric module including a configurable monitoring module configured to perform filtering so that selective information is extracted from the network packets collected through the one or more physical interfaces.

The configurable monitoring module may include a packet information filtering unit for extracting only information to be monitored, as monitoring information, from the network packets collected through the one or more physical interfaces based on input monitoring setting information; and an information transmission unit for transmitting the monitoring information extracted by the packet information filtering unit depending on a transmission method defined in the monitoring setting information.

The monitoring setting information may include a monitoring target including conditions of each network packet to be monitored, monitoring information required to determine which information of each collected network packet is to be monitored, and a monitoring scheme required to determine an interface, to which the monitoring information is to be transmitted, and a monitoring information transmission method.

The monitoring target may include information specifying a name of each physical interface to be monitored, and specifying whether each packet to be monitored through each physical interface is inbound or outbound.

The monitoring information may include preamble, start of frame, destination Media Access Control (MAC), source MAC, and length/type fields, upon extracting information of a layer 2 packet.

The monitoring information may include source IP address, destination IP address, header length, protocol number, and Time To Live (TTL) fields, upon extracting information of a layer 3 packet.

The monitoring information may include source port, destination port, sequence number, Acknowledgement (ACK) number, and flag fields, upon extracting information of a layer 4 packet.

The network information transmission method may be one of a single packet copy method of maintaining a format of the network packet without change, a single packet copy and remote transmission method of transmitting a part copied using the single packet copy method to monitoring information reception equipment using a protocol desired by the user, a single packet information remote transmission method of transmitting only monitoring information of the network packet to the monitoring information reception equipment using a specific protocol whenever a monitoring target packet is generated, and a multi-packet information remote transmission method of gathering monitoring information of multiple packets into a single packet and transmitting the single packet.

The monitoring information may include a timestamp of each of the network packets collected through the one or more physical interfaces, and an interface name indicating a physical interface through which the corresponding network packet is received.

In accordance with another aspect of the present invention to accomplish the above object, there is provided a selective information monitoring method, including receiving, by one or more physical interfaces connected to a monitoring target host, network packets from the monitoring target host; and performing, by a configurable monitoring module, filtering to enable selective information to be extracted from the network packets collected through the one or more physical interfaces.

Performing the filtering to enable selective information to be extracted may include extracting only information to be monitored, as monitoring information, from the network packets collected through the one or more physical interfaces based on input monitoring setting information; and transmitting the extracted monitoring information depending on a transmission method defined in the monitoring setting information.

BRIEF DESCRIPTION OF THE DRAWINGS

The above and other objects, features and advantages of the present invention will be more clearly understood from the following detailed description taken in conjunction with the accompanying drawings, in which:

FIG. 4 is a diagram showing a method of setting only a part of monitoring target information to monitoring information;

DESCRIPTION OF THE PREFERRED EMBODIMENTS

Figure 1:
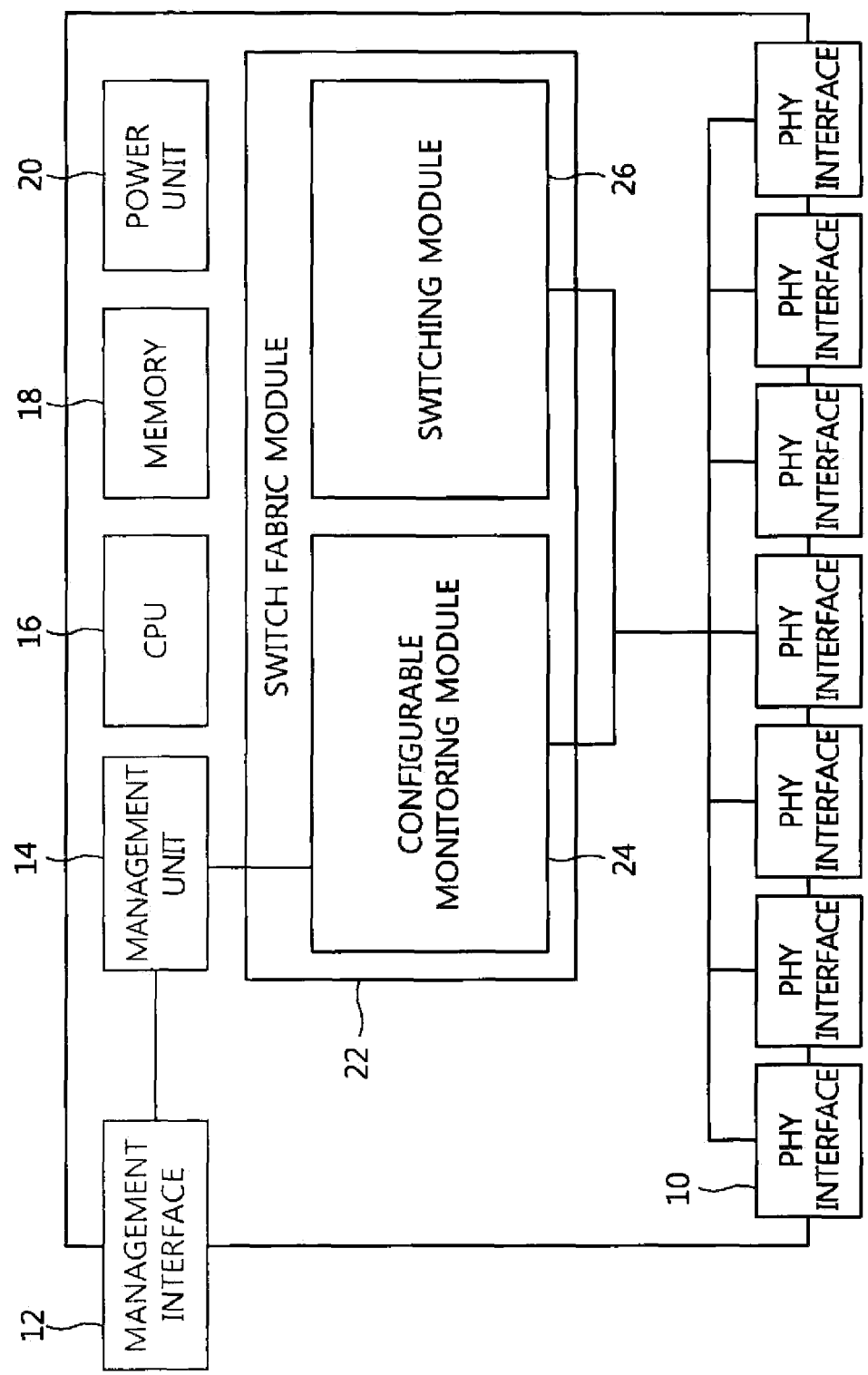
FIG. 1 is a configuration diagram showing a network apparatus according to an embodiment of the present invention.

The present invention may be variously changed and may have various embodiments, and specific embodiments will be described in detail below with reference to the attached drawings.

However, it should be understood that those embodiments are not intended to limit the present invention to specific disclosure forms and they include all changes, equivalents or modifications included in the spirit and scope of the present invention.

The terms used in the present specification are merely used to describe specific embodiments and are not intended to limit the present invention. A singular expression includes a plural expression unless a description to the contrary is specifically pointed out in context. In the present specification, it should be understood that the terms such as "include" or "have" are merely intended to indicate that features, numbers, steps, operations, components, parts, or combinations thereof are present, and are not intended to exclude a possibility that one or more other features, numbers, steps, operations, components, parts, or combinations thereof will be present or added.

Unless differently defined, all terms used here including technical or scientific terms have the same meanings as, the terms generally understood by those skilled in the art to which the present invention pertains. The terms identical to those defined in generally used dictionaries should be interpreted as having meanings identical to contextual meanings of the related art, and are not interpreted as being ideal or excessively formal meanings unless they are definitely defined in the present specification.

Embodiments of the present invention will be described in detail with reference to the accompanying drawings. In the following description of the present invention, the same reference numerals are used to designate the same or similar elements throughout the drawings and repeated descriptions of the same components will be omitted.

Figure 2:
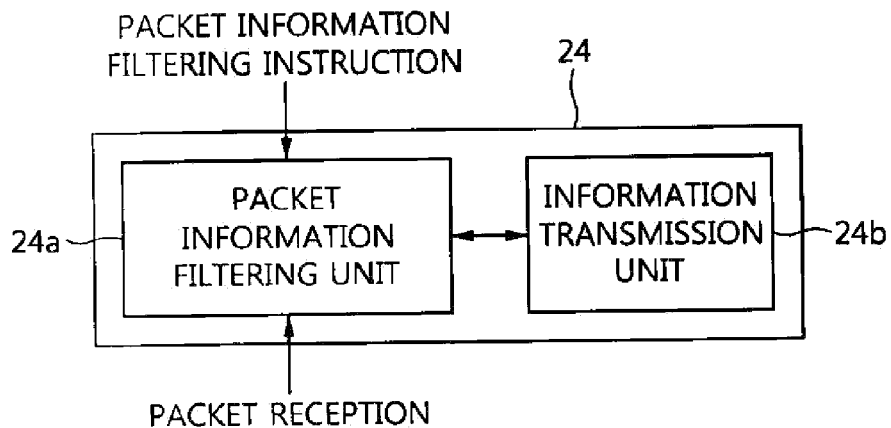
FIG. 2 is a diagram showing the internal configuration of a configurable monitoring module shown in FIG. 1.
Figure 3:
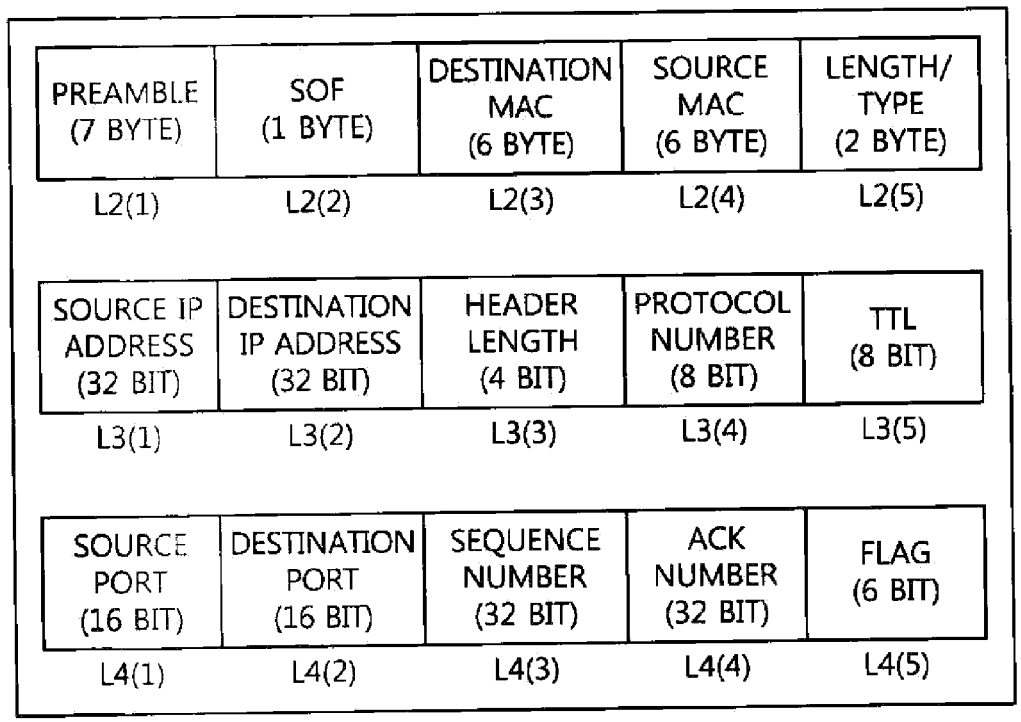
FIG. 3 is a diagram illustrating monitoring target information of a packet employed in an embodiment of the present invention.
Figure 5:
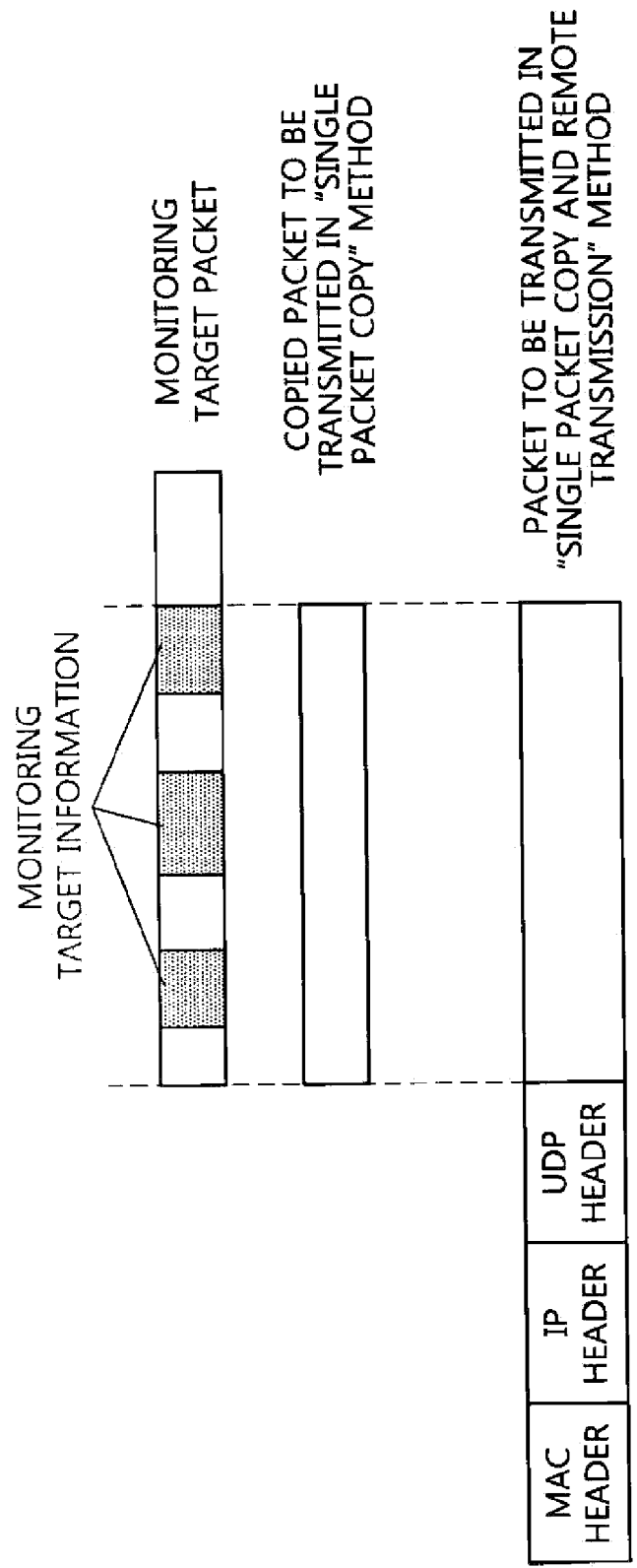
FIG. 5 is a diagram showing a comparison between a single packet copy method and a single packet copy and remote transmission method.
Figure 6:
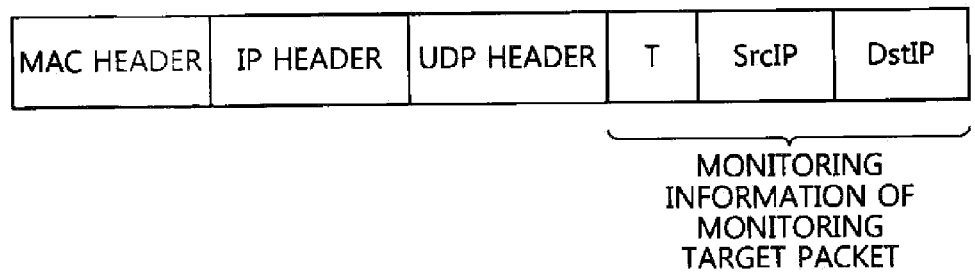
FIG. 6 is a diagram showing an example of single packet information remote transmission.
Figure 7:
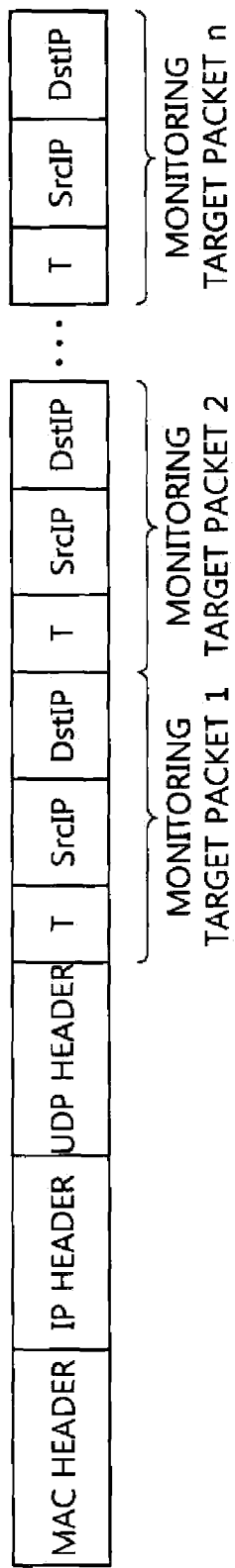
FIG. 7 is a diagram showing an example of multi-packet information remote transmission.

FIG. 1 is a configuration diagram showing a network apparatus according to an embodiment of the present invention, FIG. 2 is a diagram showing the internal configuration of a configurable monitoring module shown in FIG. 1, FIG. 3 is a diagram illustrating monitoring target information of a packet employed in an embodiment of the present invention, FIG. 4 is a diagram showing a method of setting only a part of monitoring target information to monitoring information, FIG. 5 is a diagram showing a comparison between a single packet copy method and a single packet copy and remote transmission method, FIG. 6 is a diagram showing an example of single packet information remote transmission, and FIG. 7 is a diagram showing an example of multi-packet information remote transmission.

In FIG. 1, the network apparatus according to the embodiment of the present invention includes physical interfaces 10, a management interface 12, a management unit 14, a Central Processing Unit (CPU) 16, memory 18, a power unit 20, and a switch fabric module 22.

The physical (PHY) interfaces 10 are physical interfaces connected to a monitoring target host (not shown). The physical interfaces 10 may receive network packets from the monitoring target host. The physical interfaces 10 may include a plurality of physical interfaces.

The management interface 12 is a physical interface for setting and managing the management unit 14.

The CPU 16 functions to process software instructions or the like and perform operations.

The memory 18 temporarily stores information such as the software instructions.

The power unit 20 is a physical interface for supplying power required to operate the apparatus of the present invention.

The switch fabric module 22 includes a Configurable Monitoring Module (CMM) 24 and a Switching Module (SM) 26. Here, the configurable monitoring module 24 is a module for performing filtering so that only required information is selectively extracted from network packets collected through one or more physical interfaces 10. The switching module 26 functions to perform switching so that physically connected monitoring target hosts are connected to the network. The configurable monitoring module 24 and the switching module 26 may be implemented as respective modules.

Meanwhile, as shown in FIG. 2, the configurable monitoring module 24 includes a packet information filtering unit 24a and an information transmission unit 24b.

The packet information filtering unit 24a extracts only information to be monitored from the packets collected by the network apparatus, based on monitoring setting information determined by the user via the management unit 14. That is, the packet information filtering unit 24a extracts only information to be monitored, as monitoring information, from network packets collected through the one or more physical interfaces, in compliance with a packet information filtering instruction (including monitoring setting information) that is input through the management unit 14.

The information transmission unit 24b transmits the monitoring information extracted by the packet information filtering unit 24a to monitoring information reception equipment (now shown) depending on a transmission method defined in the monitoring setting information.

For monitoring setting information that is input to the packet information filtering unit 24a, items to be determined by the user include a monitoring target, monitoring information, and a monitoring scheme.

The term "monitoring target" denotes the conditions of packets to be monitored, as shown in the following Table 1.

TABLE 1

| Condition | Description |
|---|---|
| Target | Specify name of each physical interface to be monitored in network equipment and specify whether packet to be monitored through each interface is inbound or outbound (a plurality of physical interfaces are available) |
| Monitoring capacity | Amount of packets to be monitored |
| Monitoring time | Time to perform monitoring |

The term "monitoring information" denotes only information of each packet that is determined to be monitored. Either the entire information or only partial information of a packet is monitored depending on the corresponding monitoring information.

Information to be monitored in the packet may be illustrated in FIG. 3. As shown in FIG. 4, the user sets only a part of pieces of monitoring target information to the monitoring information. Referring to FIG. 4, the monitoring information may include timestamp T of each of network packets collected through one or more physical interfaces, and interface name P indicating a physical interface through which the corresponding network packet is input. The timestamp T may be regarded as a time at which the corresponding network packet arrives at the network apparatus.

Here, when information to be set to the monitoring information is the information of a layer 2 packet (that is, upon extracting layer 2 packet information), packets may be selected based on {"preamble", "SOF", "destination MAC", "source MAC", "length/type"}.

"Preamble" denotes a field functioning to indicate whether an Ethernet frame has been transmitted.

"Start of Frame (SOF)" denotes a field functioning to indicate the start of a frame.

"Destination Media Access Control (MAC)" denotes the address of the hardware of a destination host.

"Source MAC" denotes the address of the hardware of a source host.

"Length/type" denotes the data length of a frame and EtherType of a protocol. The value of EtherType, which is the content of a communication protocol in use, includes communication protocol-related content, such as Internet Protocol version 4 (IPv4), Address Resolution Protocol (ARP), Appletalk, and IEEE 802.1Q Internet Protocol Version 6 (IPv6).

Meanwhile, when information to be set to the monitoring information is the information of a layer 3 packet (that is, upon extracting layer 3 packet information), packets may be selected based on the field of an Internet Protocol (IP) header as the extraction information of a network session. In the present invention, fields required for the connectivity of communication and for monitoring may be selected based on {"source IP address", "destination IP address", "header length", "protocol number", and "TTL"}.

"Source IP address" denotes the source IP address of a packet.

"Destination IP address" denotes the destination IP address of a packet.

"Header length" denotes the length of an IP header of the corresponding packet.

"Protocol number" denotes the protocol type of the corresponding packet, and indicates the number of a protocol such as a Transmission Control Protocol (TCP), a User Datagram Protocol (UDP), or an Internet Control Message Protocol (ICMP).

"TTL" denotes Time To Live (the lifetime) of a network packet.

Meanwhile, when information to be set to the monitoring information is the information of a layer 4 packet (that is, upon extracting layer 4 packet information), information contained in "source port", "destination port", "sequence number", "Acknowledgement (ACK) number", and "flag" fields is used.

"Source port" denotes the port number of a source.

"Destination port" denotes the port number of a destination.

"Sequence number" denotes the response number and identification number of a packet.

"ACK number" denotes the response (acknowledgement) number of a packet.

"Flag" is related to a data flow and connection control in a header and uses about 8 bits. "Flag" field may be divided into Congestion Window Reduced (CWR), Explicit Congestion Notification (ECN)-Echo (ECE), Urgent (URG), Acknowledgement (ACK), Push (PSH), Reset (RST), Synchronize Sequence Number (SYN), and Finish (FIN).

Further, in the monitoring scheme, the interface of network equipment to which the monitoring information is to be transmitted and a method for transmitting monitoring information must be determined. Here, monitoring information transmission methods may be classified into four types, as shown in the following Table 2.

TABLE 2

| Type | Description |
| --- | --- |
| Single packet copy | Copy only part of target packet ranging from start to predetermined byte to include monitoring information of target packet, and transmit copied part to monitoring interface |
| Single packet copy and remote transmission | Copy only part of target packet ranging from start to predetermined byte to include monitoring information of target packet, and transmit copied part to monitoring target using specific protocol<br>Items to be determined by user<br>Transfer protocol: TCP, UDP, ICMP, ARP, etc.<br>Reception equipment information: MAC, IP, port, etc. according to transfer protocol |
| Single packet information remote transmission | Set equipment to receive monitoring information and transmit monitoring information of each monitoring target packet each time using specific protocol<br>Items to be determined by user<br>Transfer protocol: TCP, UDP, ICMP, ARP, etc.<br>Reception equipment information: MAC, IP, port, etc. according to transfer protocol |
| Multi-packet information remote transmission | Set equipment to receive monitoring information, gather pieces of monitoring information of multiple monitoring target packets, and transmit gathered monitoring information using specific protocol<br>Items to be determined by user<br>Transfer protocol: TCP, UDP, ICMP, ARP, etc.<br>Reception equipment information: MAC, IP, port, etc. according to transfer protocol |

In Table 2, the term "single packet copy" denotes a method of maintaining the format of a monitoring target packet without change, as in the case of mirroring or tapping equipment. Based on the settings of the management unit 14, a part of a monitoring target packet may be excluded depending on monitoring information.

The term "single packet copy and remote transmission" denotes a method in which the network apparatus proposed in the present invention transmits a part copied using the "single packet copy" method to equipment which will receive monitoring information, using the user's desired protocol.

FIG. 5 is a diagram showing a simple comparison between the "single packet copy" method and the "single packet copy and remote transmission" method (upon using a UDP). In this case, in each of a MAC header, an IP header, and a UDP header, source MAC (src MAC), source IP (src IP), and source port (src port) denote information about the network apparatus proposed in the present invention, and destination MAC (dst MAC), destination IP (dst IP), and destination port (dst port) denote information about equipment which will receive monitoring information.

Meanwhile, "single packet information remote transmission" denotes a method in which the network apparatus proposed in the present invention transmits only monitoring information of a monitoring target packet to equipment which will receive the monitoring information, using a specific protocol whenever a monitoring target packet is generated.

FIG. 6 illustrates an example of "single packet information remote transmission." When a transfer protocol is UDP, and monitoring information is timestamp (T), source IP (Src IP), and destination IP (Dst IP), only the corresponding information is transmitted using a payload portion of the UDP. In this case, in each of a MAC header, an IP header, and a UDP header, source MAC (src MAC), source IP (src IP), and source port (src port) denote information about the network apparatus proposed in the present invention, and destination MAC (dst MAC), destination IP (dst IP), and destination port (dst port) denote information about the equipment which will receive the monitoring information.

In this way, there is an advantage in that the network apparatus proposed in the present invention and the equipment which will receive the monitoring information may remotely transmit information as long as they are connected to the network. Further, since the monitoring information is transmitted with a timestamp (T) included in the monitoring information, there is an advantage in that information about a time at which the monitoring target packet arrives at the network apparatus presented in the present invention can be exactly known regardless of a time delay occurring in the transmission of monitoring information.

Further, "multi-packet information remote transmission" denotes a method similar to "single packet information remote transmission," and is a method of gathering pieces of monitoring information of multiple packets into a single packet and transmitting the single packet.

FIG. 7 illustrates an example of "multi-packet information remote transmission." If monitoring information is determined, and maximum capacity at which information can be sent using a single packet is determined, the number of monitoring packets, the information of which can be included in and transmitted as a single packet, may be known. In this way, since the pieces of information of multiple monitoring target packets can be transmitted by means of a single packet, the transmission traffic of monitoring information may be greatly reduced and the speed (pps, packet per second) thereof may be greatly improved. In particular, the improvement of pps may result in a decrease in problems such as packet drop in a reception procedure caused by the limited performance of a monitoring information reception system.

Figure 8:
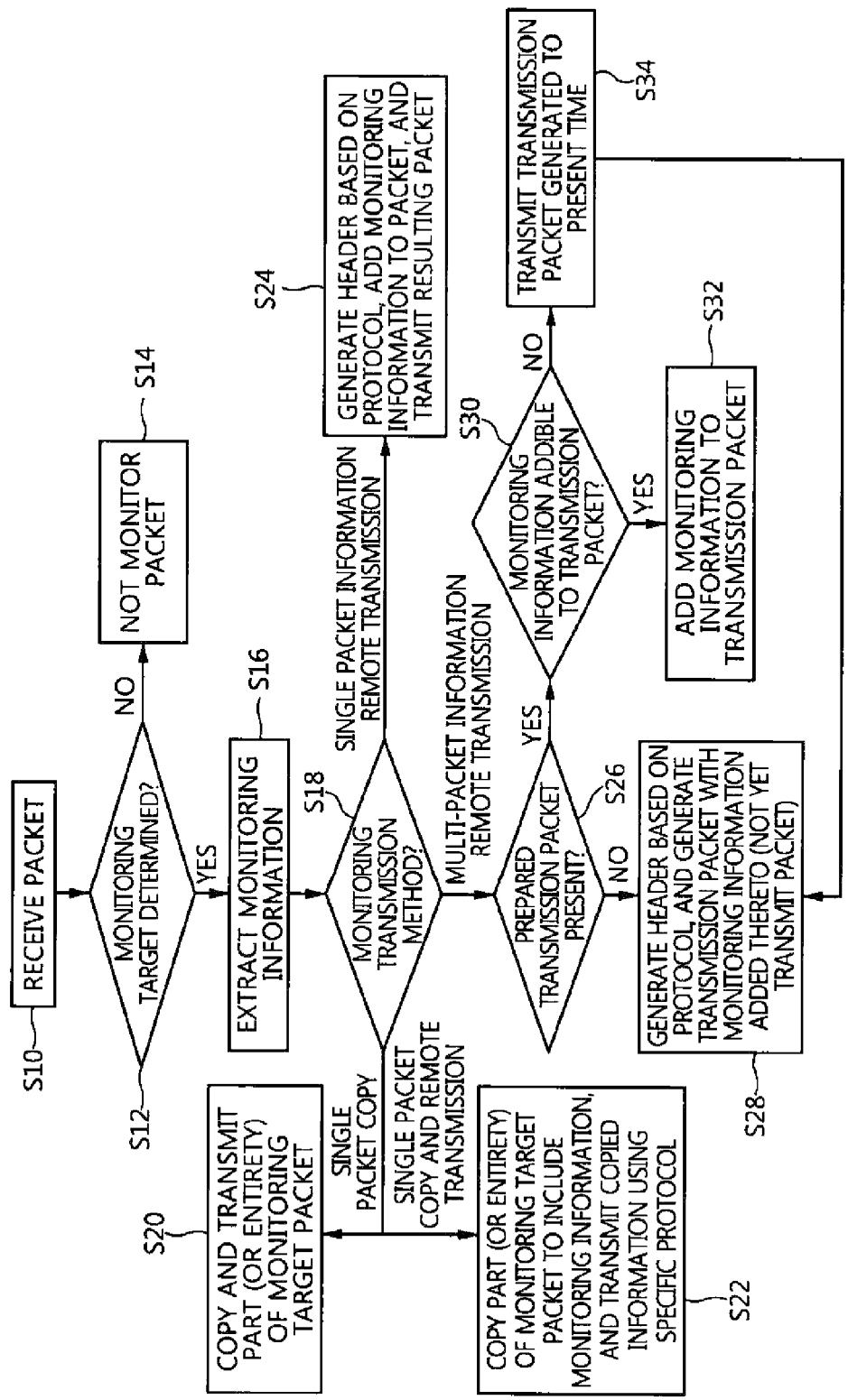
FIG. 8 is a flowchart showing a selective information monitoring method according to an embodiment of the present invention.

FIG. 8 is a flowchart showing a selective information monitoring method according to an embodiment of the present invention.

First, at step S10, the physical (PHY) interface 10 receives a packet from a monitoring target host (not shown). The physical (PHY) interface 10 transfers the received packet to the configurable monitoring module 24 of the switch fabric module 22.

At step S12, the configurable monitoring module 24 determines whether to monitor a monitoring target host by determining whether the current host is a monitoring target host, based on the information set by the management unit 14.

If it is determined that the current host is not a monitoring target host, the packet is not monitored at step S14, whereas if it is determined that the current host is the monitoring target host, the configurable monitoring module 24 extracts monitoring information from the packet in the format of FIGS. 3 and 4 at step S16.

Then, at step S18, if the extraction of monitoring information has been completed, the configurable monitoring module 24 checks a monitoring transmission method. Here, the monitoring transmission method may be determined and processed, as given in Table 2. This enables determination to be made in relation to whether to monitor the entire information of the monitoring target packet or whether to monitor only partial information of the monitoring target packet, and the results of determination are processed.

The configurable monitoring module 24 is configured to, if a transmission method corresponding to "single packet copy" is set in response to the packet monitoring setting information of the management unit 14, copy either a part of the monitoring target packet ranging from the start to a predetermined byte or the entirety of the monitoring target packet so that monitoring information of the monitoring target packet is included, and transmit the copied information at step S20.

The configurable monitoring module 24 is configured to, if a transmission method corresponding to "single packet copy and remote transmission" is set in response to the packet monitoring setting information of the management unit 14, copy either a part of the monitoring target packet ranging from the start to a predetermined byte or the entirety of the monitoring target packet so that the monitoring information of the monitoring target packet is included, and transmit the copied information using a specific protocol at step S22.

The configurable monitoring module 24 is configured to, if a transmission method corresponding to "single packet information remote transmission" is set in response to the packet monitoring setting information of the management unit 14, generate a header based on a protocol, add monitoring information to the packet, and transmit a resulting packet at step S24.

The configurable monitoring module 24 is configured to, if a transmission method corresponding to "multi-packet information remote transmission" is set in response to the packet monitoring setting information of the management unit 14, check whether any prepared transmission packet is present at step S26.

The configurable monitoring module 24 is configured to, if, as a result of checking at step S26, any prepared transmission packet is not present, generate a header based on a protocol, and generate a transmission packet with the monitoring information added thereto at step S28. At step S28, the generated transmission packet is not yet transmitted.

If, as a result of checking at step S26, any prepared transmission packet is present, it is determined whether monitoring information can be added to the transmission packet at step S30.

If it is determined that the monitoring information can be added to the transmission packet, the configurable monitoring module 24 adds the monitoring information to the transmission packet at step S32.

In contrast, if it is determined that monitoring information cannot be added to the transmission packet, the configurable monitoring module 24 transmits the transmission packet generated to the present time at step S34.

In accordance with the present invention having the above configuration, specific information can be monitored from all packets, without causing packet drop, in order to precisely analyze traffic, thus enabling only information desired by a traffic analysis system (that is, desired by the user) to be monitored from the packets.

By means of this function, the amount of traffic that is transmitted for monitoring is reduced, thus helping the monitoring of information of all packets.

As described above, optimal embodiments of the present invention have been disclosed in the drawings and the specification. Although specific terms have been used in the present specification, these are merely intended to describe the present invention and are not intended to limit the meanings thereof or the scope of the present invention described in the accompanying claims. Therefore, those skilled in the art will appreciate that various modifications and other equivalent embodiments are possible from the embodiments. Therefore, the technical scope of the present invention should be defined by the technical spirit of the claims.

What is claimed is:

1. A network apparatus, comprising:
one or more physical interfaces connected to a monitoring target host and configured to receive network packets from the monitoring target host; and
in response to receipt of the network packets, a configurable monitoring module comprising a packet information filtering unit and an information transmission unit which being configured and executed by a processor using algorithm, which when executed, causes the processor
to determine whether to monitor the monitoring target host by determining whether a current host is a monitoring target host,
in response to detection of the current host being the monitoring target host, to extract selective information to be monitored from the network packets collected through the one or more physical interfaces and
to transmit the extracted selective information according to monitoring setting information which configured to specify selective information to be extracted from the network packets and how to transmit by algorithm, the algorithm being performed by the processor according to the following condition, the algorithm enables a determination to be made in relation to whether to monitor entire information of the network packets or whether to monitor partial information of the network packets,
in response to detection of a single packet copy, to transmit entire information by maintaining a format of the network packets without change,
in response to detection of a single packet copy and remote transmission method, to transmit partial information copied using the single packet copy to monitoring information reception equipment using a protocol,
in response to detection of a single packet information remote transmission method, to transmit only monitoring information of the network packets to monitoring information reception equipment using a specific protocol by generating a header based on the specific protocol, and adding the monitoring information to the network packets, and
in response to detection of a multi-packet information remote transmission method to transmit information by gathering monitoring information of multiple packets into a single packet and transmitting the single packet.

2. The network apparatus of claim 1, wherein the monitoring setting information includes a monitoring target including conditions of each network packet to be monitored, monitoring information required to determine which information of each collected network packet is to be monitored, and a monitoring scheme required to determine an interface, to which the monitoring information is to be transmitted, and a monitoring information transmission method.

3. The network apparatus of claim 2, wherein the monitoring target includes information is configured to specify a name of each physical interface to be monitored, and specifying whether each packet to be monitored through each physical interface is inbound or outbound.

4. The network apparatus of claim 2, wherein the monitoring information includes preamble, start of frame, destination Media Access Control (MAC), source MAC, and length/type fields, upon extracting information of a layer 2 packet.

5. The network apparatus of claim 2, wherein the monitoring information includes source Internet Protocol (IP) address, destination IP address, header length, protocol number, and Time To Live (TTL) fields, upon extracting information of a layer 3 packet.

6. The network apparatus of claim 2, wherein the monitoring information includes source port, destination port, sequence number, Acknowledgement (ACK) number, and flag fields, upon extracting information of a layer 4 packet.

7. The network apparatus of claim 2, wherein the monitoring information includes a timestamp of each of the network packets collected through the one or more physical interfaces, and an interface name indicating a physical interface through which the corresponding network packet is received.

8. A computer implemented selective information monitoring method, comprising:
receiving network packets from a monitoring target host;
determining whether to monitor the monitoring target host by determining whether a current host is a monitoring target host;
in response to detection of the current host being the monitoring target host, extracting selective information to be monitored from the network packets collected through one or more physical interfaces connected to the monitoring target host; and
transmitting the extracted selective information according to monitoring setting information which specify selective information to be extracted from the network packets and how to transmit by algorithm, the algorithm being performed by the processor according the following condition, the algorithm enables a determination to be made in relation to whether to monitor entire information of the network packets or whether to monitor partial information of the network packets,
in response to detection of a single packet copy, to transmit an entire information by maintaining a format of the network packets without change,
in response to detection of a single packet copy and remote transmission method, to transmit a partial information copied using the single packet copy to monitoring information reception equipment using a protocol,
in response to detection of a single packet information remote transmission method, to transmit only monitoring information of the network packets to monitoring information reception equipment using a specific protocol by generating a header based on the specific protocol, and adding the monitoring information to the network packets, and
in response to detection of a multi-packet information remote transmission method, to transmit information by gathering monitoring information of multiple packets into a single packet and transmitting the single packet.

9. The selective information monitoring method of claim 8, wherein the monitoring setting information includes a monitoring target including conditions of each network packet to be monitored, monitoring information required to determine which information of each collected network packet is to be monitored, and a monitoring scheme required to determine an interface, to which the monitoring information is to be transmitted, and a monitoring information transmission method.

10. The selective information monitoring method of claim 9, wherein the monitoring target includes information specifying a name of each physical interface to be monitored, and specifying whether each packet to be monitored through each physical interface is inbound or outbound.

11. The selective information monitoring method of claim 9, wherein the monitoring information includes preamble, start of frame, destination Media Access Control (MAC), source MAC, and length/type fields, upon extracting information of a layer 2 packet.

12. The selective information monitoring method of claim 9, wherein the monitoring information includes source IP address, destination IP address, header length, protocol number, and Time To Live (TTL) fields, upon extracting information of a layer 3 packet.

13. The selective information monitoring method of claim 9, wherein the monitoring information includes source port, destination port, sequence number, Acknowledgement (ACK) number, and flag fields, upon extracting information of a layer 4 packet.

14. The selective information monitoring method of claim 9, wherein the monitoring information includes a timestamp of each of the network packets collected through the one or more physical interfaces, and an interface name indicating a physical interface through which the corresponding network packet is received.

* * * * *